United States Patent
Ndu et al.

(10) Patent No.: US 10,740,125 B2
(45) Date of Patent: Aug. 11, 2020

(54) MEMRISTIVE DOT PRODUCT ENGINE VIRTUALIZATION

(71) Applicant: HEWLETT PACKARD ENTERPRISE DEVELOPMENT LP, Houston, TX (US)

(72) Inventors: Geoffrey Ndu, Bristol (GB); Dejan Milojicic, Palo Alto, CA (US); Sai Rahul Chalamalasetti, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 216 days.

(21) Appl. No.: 15/884,030

(22) Filed: Jan. 30, 2018

(65) Prior Publication Data

US 2019/0235889 A1    Aug. 1, 2019

(51) Int. Cl.
| | |
|---|---|
| H04L 29/06 | (2006.01) |
| G06F 9/455 | (2018.01) |
| G06F 9/50 | (2006.01) |
| G06F 17/16 | (2006.01) |

(52) U.S. Cl.
CPC .......... *G06F 9/455* (2013.01); *G06F 9/5011* (2013.01); *G06F 17/16* (2013.01); *H04L 63/0428* (2013.01); *H04L 63/102* (2013.01); *G06F 9/5005* (2013.01); *G06F 9/5061* (2013.01)

(58) Field of Classification Search
CPC ........ G06F 9/455; G06F 9/5011; G06F 17/16; G06F 9/5005; H04L 63/0428; H04L 63/102

USPC ........................................................ 713/164
See application file for complete search history.

(56) References Cited

U.S. PATENT DOCUMENTS

| | | |
|---|---|---|
| 8,914,528 B2 | 12/2014 | Chan et al. |
| 2016/0210167 A1 | 7/2016 | Bolic et al. |
| 2016/0283240 A1* | 9/2016 | Mishra ................ G06F 9/30036 |
| 2016/0373416 A1 | 12/2016 | Burger et al. |
| 2018/0188961 A1* | 7/2018 | Venkatesh ........... G06F 13/1663 |
| 2018/0189638 A1* | 7/2018 | Nurvitadhi ............ G06N 3/063 |
| 2019/0235889 A1* | 8/2019 | Ndu ........................ G06F 9/455 |

OTHER PUBLICATIONS

Liewei Bao; On-Chip Interconnection Architecture of the Tile Processor; IEEE: 2007; p. 14-31.*

Krawczyk, Hugo. "SIGMA: The 'SIGn-and-MAc' approach to authenticated Diffie-Hellman and its use in the IKE protocols." Annual International Cryptology Conference. Springer Berlin Heidelberg, 2003, 32 pages.

(Continued)

*Primary Examiner* — Monjur Rahim
(74) *Attorney, Agent, or Firm* — Dhand Law PC

(57) ABSTRACT

An example system includes at least one memristive dot product engine (DPE) having at least one resource, the DPE further having a physical interface and a controller, the controller being communicatively coupled to the physical interface, the physical interface to communicate with the controller to access the DPE, and at least one replicated interface, each replicated interface being associated with a virtual DPE, the replicated interface with communicatively coupled to the controller. The controller is to allocate timeslots to the virtual DPE through the associated replicated interface to allow the virtual DPE access to the at least one resource.

12 Claims, 6 Drawing Sheets

(56) References Cited

OTHER PUBLICATIONS

Miao, et al., "Dot-product engine for neuromorphic computing: programming 1T1M crossbar to accelerate matrix-vector multiplication", Proceedings of the 53rd Annual Design Automation Conference Article No. 19, 2016, 7 pages.

Pedro Bruel et al., "Generalize or Die: Operating Systems Support for Memristor-based Accelerators," Nov. 2017, pp. 1-8, IEEE.

Shafiee et al., "ISAAC: A convolutional neural network accelerator with in-situ analog arithmetic in crossbars", 2016 ACM/IEEE 43rd Annual International Symposium on Computer Architecture (ISCA), 13 pages.

Hu, M. et al.; "Dot-product Engine as Computing Memory to Accelerate Machine Learning Algorithms"; Mar. 15-16, 2016; 3 pages.

* cited by examiner

MEMRISTIVE DOT PRODUCT ENGINE VIRTUALIZATION

BACKGROUND

Resistive memory elements often referred to as memristors are devices that may be programmed to different resistive states by applying electrical voltage or currents to the memristors. Crossbar arrays of memristors may be used in a variety of applications, including non-volatile memory, programmable logic, etc. In this regard, a memristive crossbar array may include a number of row lines and a number of column lines intersecting the row lines. One application of such an arrangement is a memristive dot product engine.

BRIEF DESCRIPTION OF THE DRAWINGS

For a more complete understanding of various examples, reference is now made to the following description taken in connection with the accompanying drawings in which.

DETAILED DESCRIPTION

Various examples described herein relate to virtualization of a memristive dot product engine (DPE). In accordance with various examples described herein, virtualization of a DPE allows sharing of DPE resources by multiple users, even if those users are distrusting of each other. Virtualization of the DPE is achieved by replicating an interface of a physical DPE for each virtual DPE, or each DPE stream layer. In this regard, a stream layer refers to a session of a virtual DPE. In various examples, a scheduler of the physical DPE may allocate various time slices to various sessions, or stream layers. The replicated interfaces may be implemented as hardware, software or firmware in a manner similar to, or identical to, an interface of the physical DPE. The replicated interfaces are communicatively coupled to a controller of the physical DPE. The controller includes the scheduler to allocate timeslots to the virtual DPEs through the replicated interfaces. Thus, each user of a virtual DPE is isolated from users of other virtual DPEs. In some examples, communication between a user of the virtual DPE and the controller of the physical DPE is encrypted to enhance security. In this regard, an associated security key is provided by the user for decryption of the information at the physical DPE or at a DPE resource. Thus, information transmitted by the user may be protected from other users (e.g., users of other virtual DPEs) or an administrator of the physical DPE, for example.

As used herein, a "dot product" refers broadly to the product of two vectors to form a scalar whose value is the product of the magnitudes of the vectors and the cosine of the angle between them. In the context of a memristive DPE, a dot product may be determined by applying a voltage to an input and multiplying the voltage by a conductance that is programmed into the DPE to get a current, as described in greater detail below with reference to FIG. 3.

Figure 1:
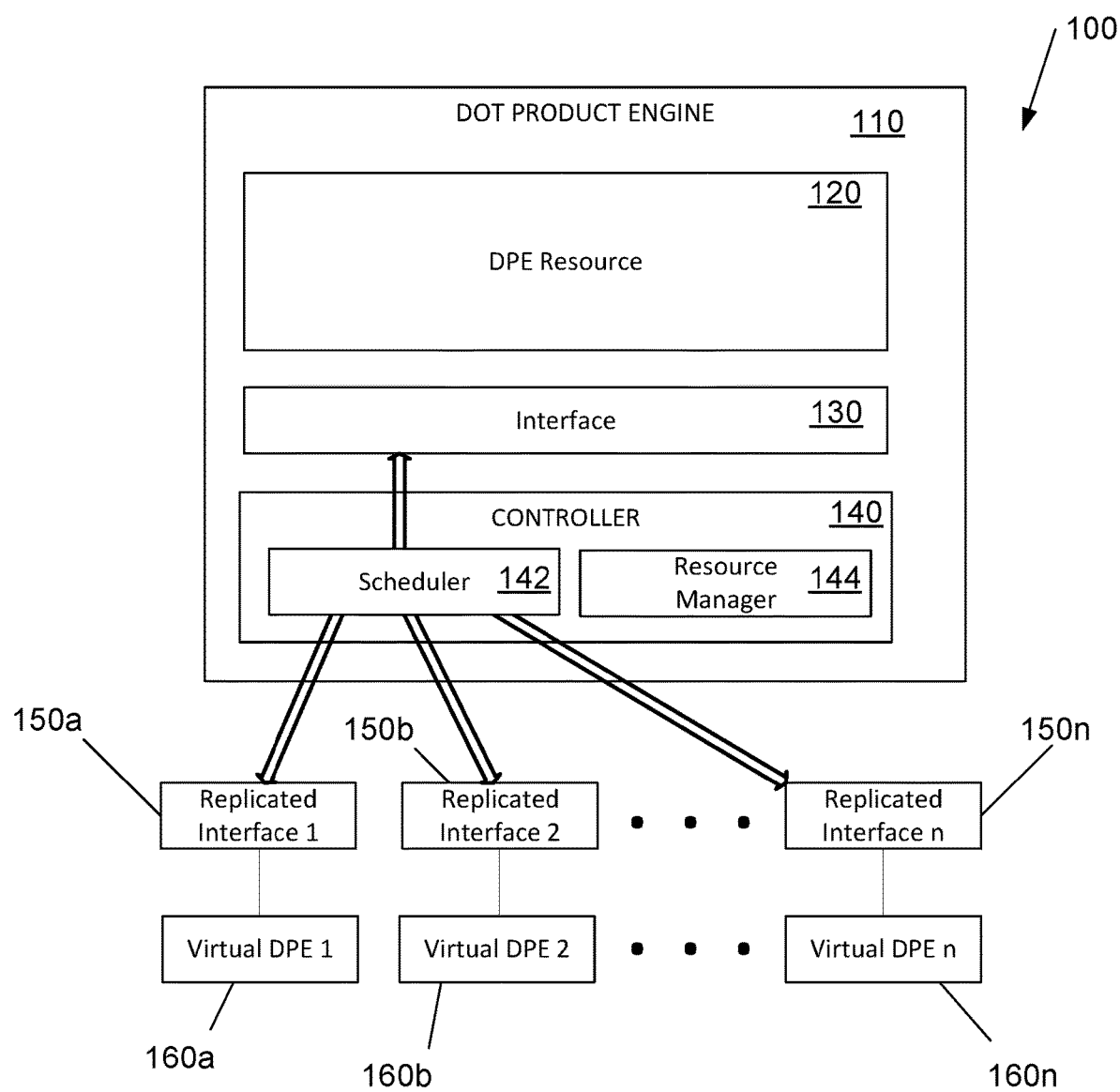
FIG. 1 illustrates an example system for virtualization of a memristive dot product engine (DPE)

Referring now to FIG. 1, an example system for virtualization of a memristive DPE is illustrated. The example system 100 includes a memristive DPE 110. As used herein, the term "memristor" may refer to a passive two-terminal circuit element that maintains a functional relationship between the time integral of current, and the time integral of voltage. Further, the term "memristive dot product engine" refers broadly to a dot product engine that includes a memristive crossbar array.

The example memristive DPE 110 of FIG. 1 includes at least one DPE resource 120. In various examples, the DPE resource 120 includes at least one memristive crossbar array which includes a number of row lines and a number of column lines intersecting the row lines. An example DPE resource 120 is described below in greater detail with reference to FIGS. 2 and 3.

The example memristive DPE 110 of FIG. 1 further includes an interface 130. In various examples, the interface 130 is an input/output interface which allows the DPE 110 to be communicatively coupled to an external component. For example, a processor of a computing system may be coupled to the DPE 110 through the interface 130 and may obtain access to the DPE resource 120.

In the example system 100 of FIG. 1, the example memristive DPE 110 is further provided with a controller 140. In various examples, the controller 140 may control various aspects of the example memristive DPE 110. For example, the controller 140 may determine which resources are available to or allocated for various tasks or users. The controller 140 in the example system 100 of FIG. 1 includes a scheduler 142 and a resource manager 144. The controller 140, or the scheduler 142 of the controller 140, is communicatively coupled to the external interface 130 to facilitate access to the DPE resource 120 by an external component, for example. The resource manager 144 may monitor availability of various portions of the DPE resource 120 and may selectively allocate the resource 120 to entities, such as the external component described above.

In various examples, the memristive DPE 110 is virtualized by replicating the external interface 130 of the physical memristive DPE 110. As illustrated in FIG. 1, the example system 100 includes replicated interfaces 150a-n. In various examples, any practical number of replicated interfaces 150a-n may be made available. In some examples, the system 100 may set a maximum number of replicated interfaces 150 to allow sufficient availability of resources.

Replication provides a mechanism by which a single physical memristive DPE 110 may appear as multiple separate physical devices to various users. In this regard, the physical memristive DPE 110 provides a unique memory space, work queues, interrupts, and command processing for each user via each replicated interface. In one example, the physical memristive DPE 110 is a Peripheral Component Interconnect Express (PCIe)-based DPE that can be configured to appear in the PCI configuration space as multiple functions. Each replicated interface provides its own configuration space. Thus, the physical memristive DPE 110 appears as separate, multiple PCIe devices.

Virtualization of the physical memristive DPE 110 may be achieved by providing a separate stream layer for each replicated interface 150. Thus, a user associated with a particular replicated interface 150 may access the resources (e.g. the DPE resource 120) of the physical memristive DPE 110 as a virtual DPE 160 through the corresponding replicated interface 150. In this regard, each replicated interface 150a-n is communicatively coupled to the controller 140, similar to the coupling of the controller 140 with the external interface 130 of the physical memristive DPE 110.

For example, in the example of FIG. 1, a user may access the DPE resource 120 of the physical memristive DPE 110 through the first replicated interface 150a. In this regard, the first replicated interface 150a may be associated with a corresponding virtual DPE 160a. The corresponding virtual DPE 160a is accommodated by the controller 140 of the physical memristive DPE 110 as a distinct stream layer. In various examples, the scheduler 142 may allocate timeslots, or time slices, to the various stream layers or virtual DPEs 160a-n.

In various examples, the scheduler 142 dynamically selects, on each timeslot, the stream layer, or virtual DPE 160, to run via the appropriate replicated interface 150. The scheduler 140 may support any of a variety of scheduling algorithms, such as round robin and weighted round robin, for example.

The resource manager 144 of the controller 140 in the example system 100 of FIG. 1 may selectively allocate the at least one resource to a virtual DPE during each timeslot. For example, the resource manager 144 may dynamically select the scheduling algorithm and manage the type of actions a user, through the appropriate virtual DPE 160, is allowed to perform. For example, a particular stream layer, or virtual DPE, may be prevented from reconfiguring the physical memristive DPE.

In various examples, the scheduler 142 and the resource manager 144 may facilitate removal of layers from the scheduling algorithm. For example, in some cases, the entirety of the physical memristive DPE 110 may be allocated to a particular stream layer for an extended number of timeslots. In this regard, the particular stream layer may be a virtual DPE 160 or an external component coupled to the physical memristive DPE 110 through the external interface 130. In this regard, use of time slots or time slicing may also be disabled for the extended period.

Figure 2:
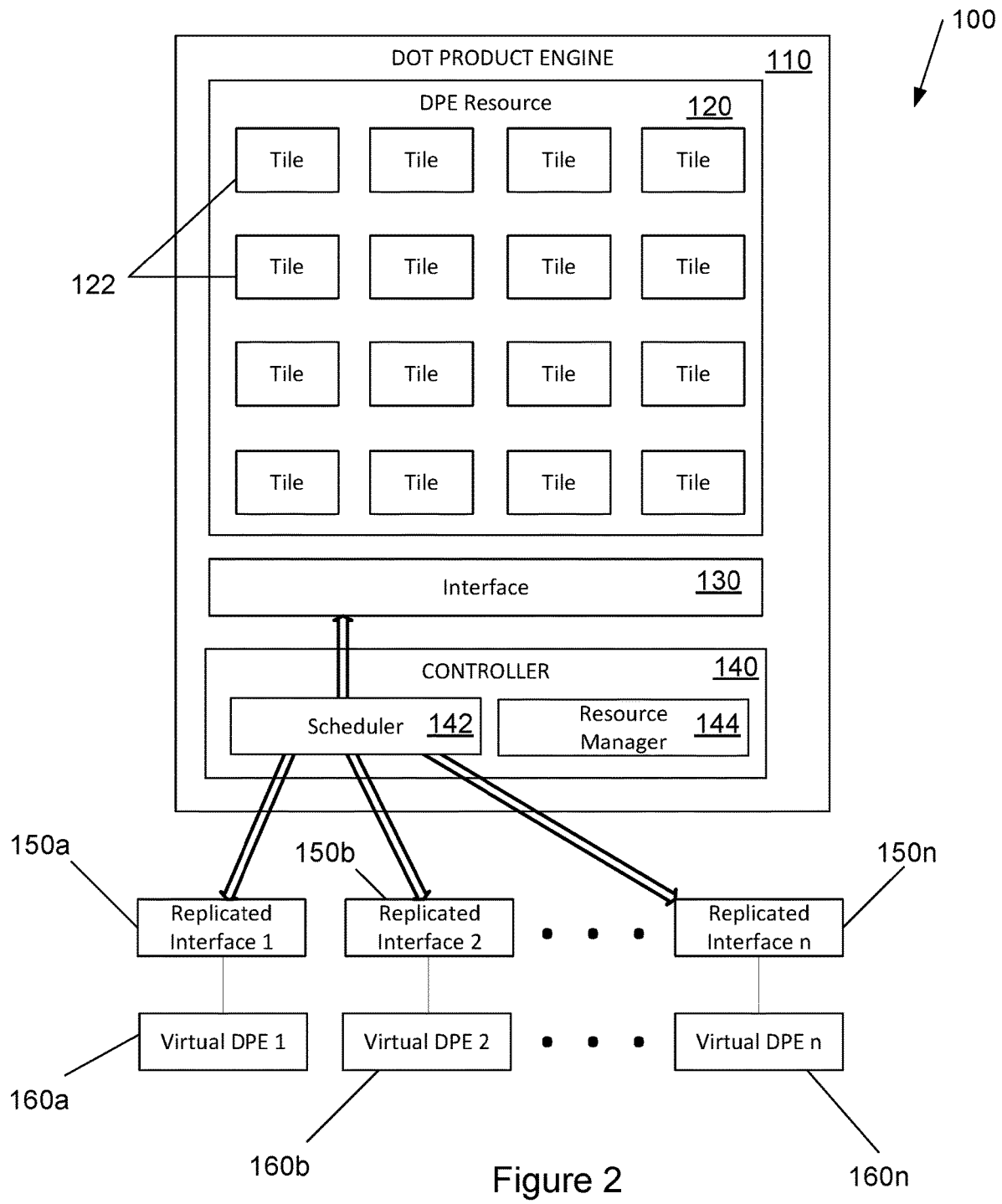
FIG. 2 illustrates the example system of FIG. 1 with an example resource of the memristive DPE.

Referring now to FIG. 2, the example system 100 of FIG. 1 is illustrated with an example DPE resource 120 of the memristive DPE 110. In the example of FIG. 2, the DPE resource 120 includes a number of tiles 122. In various examples, each tile 122 is a subset of the DPE resource 120. A number of tiles 122 may be allocated to a particular task or stream layer, for example. In this regard, the DPE resource 120 may be divided to accommodate and support any number of tasks simultaneously. Further, the tiles 122 may be arranged in any of a variety of manners. For example, in the example of FIG. 2, the tiles 122 are arranged in an array.

Figure 3:
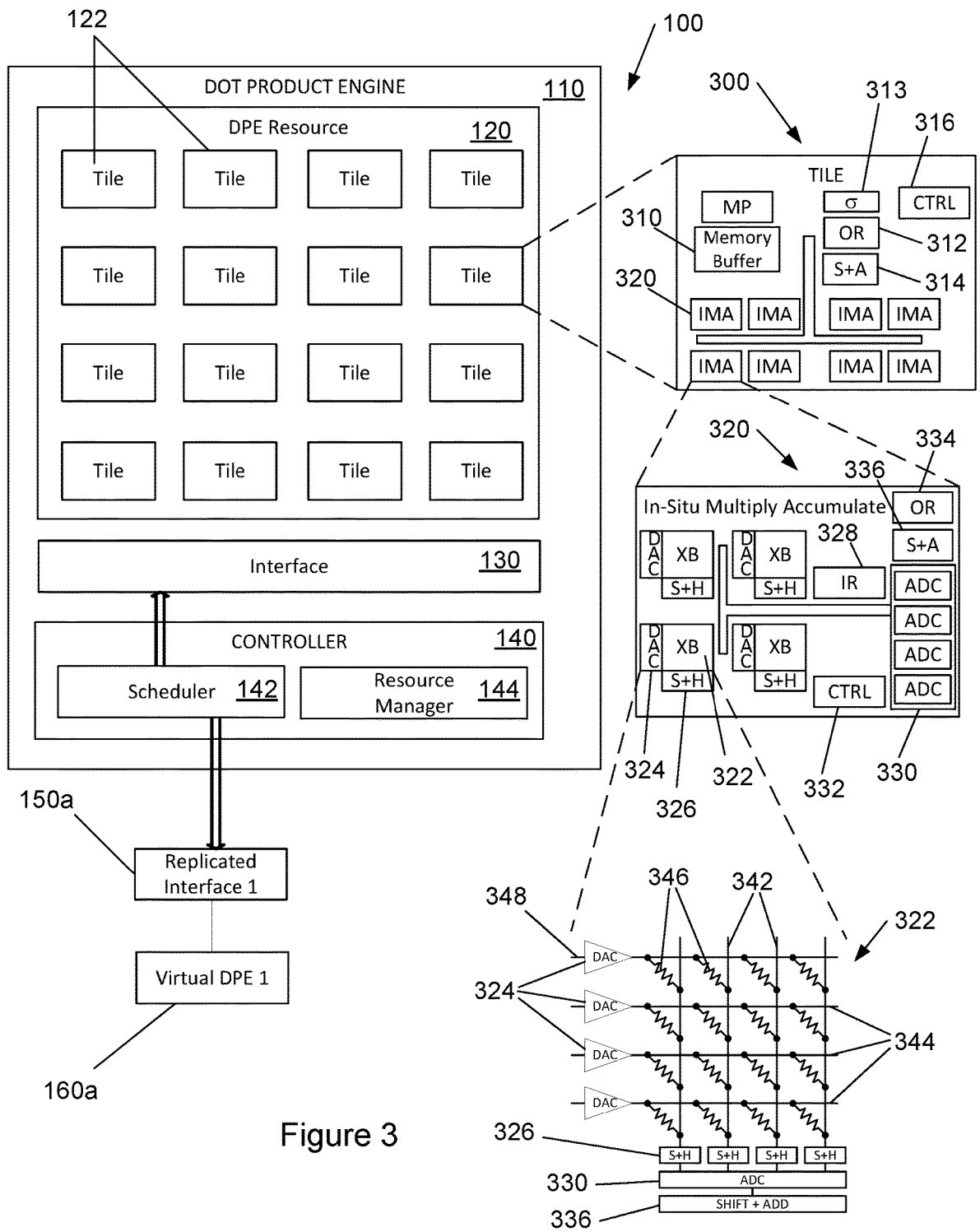
FIG. 3 illustrates the example system of FIG. 2 with an example detailed illustration of a tile in the resource of the memristive DPE.

Referring now to FIG. 3, the example system of FIG. 2 is illustrated with an example detailed illustration of a tile 122 in the DPE resource 120 of the memristive DPE 110. The example tile 300 of FIG. 3 is an example architecture using a memristive crossbar array. In this regard, the example tile 300 of FIG. 3 includes a memory buffer 310 (e.g., an enhanced dynamic random access memory, or eDRAM, buffer), as well as various other components such as an output register 312 and a shift-and-add unit 314. Memory buffer 310 may be, for example, a DRAM buffer or another type and may be used to store input values provided to the crossbar array 322 described below. Further, the output register 312 may be used to aggregate results from the shift-and-add unit 314, as also described below. Each tile of the DPE resource 120, such as the tile 300, is provided with a control unit 316 which may be communicatively coupled to the controller 140 of the memristive DPE 110. In this regard, each tile 122 is coupled to the controller 140 through a bus, providing connections between the controller 140 and various components of each tile 122, such as the control unit 316. The example tile 300 is provided with a set of components, referred to as in-situ multiply accumulate (IMA) units 320. In the example of FIG. 3, the tile 300 is provided with eight IMA units 320.

One example architecture of an IMA unit 320 is illustrated in detail in FIG. 3. In the illustrated example, the IMA unit 320 is provided with a number of memristor crossbar units 322. In the example of FIG. 3, the IMA unit 320 is provided with four memristor crossbar units 322. Each crossbar unit 322 is coupled to a digital-to-analog converter (DAC) 324 and a sample-and-hold unit 326. Signals from the DACs 324 may be combined (e.g., via an input register 328) and provided to a set of analog-to-digital converters (ADCs) 330. The IMA unit 320 of FIG. 3 further includes a control unit 332 which may be communicatively coupled to the controller 140 of the memristive DPE 110, for example, through the control unit 316 of the tile 300. The IMA unit 320 further includes various other components, such as an output register 334 and a shift-and-add unit 336. In various examples, the output register 334 of the IMA unit 320 may be part of or coupled to the output register 312 of the tile 300. Similarly, the shift-and-add unit 336 of the IMA unit 320 may be part of or coupled to the shift-and-add unit 314 of the tile 300.

In various examples, each memristive crossbar array 322 includes a number of row lines and a number of column lines 342 intersecting the row lines 344. A memristive memory element 346 is located at each intersection of a row line 344 and a column line 342. Each memristive element 346 receives a programming vector signal to represent a value within a matrix, a reference vector signal, and an operating vector signal to represent a vector value to be multiplied by the matrix. In this regard, the row lines 344 of the crossbar array 322 are coupled to the DACs 322 to provide the row lines 344 with an input voltage 348, in accordance with input values stored in the memory buffer 310, forming the input vector signal. Further, each column line 342 is coupled to the sample-and-hold unit 326 to receive a current flow from the column lines 342. Each sample-and-hold unit 326 is coupled to an ADC 330 and shift-and-add unit 336 to convert the electrical current in the column line 342 to a voltage signal. In various examples of the DPE HO, vector and matrix multiplications are performed by applying the input voltages to the row lines 344 and collecting the currents through the column lines 342 and measuring the output voltage.

Thus, dot-product operations may be performed on the crossbar arrays 322, and the results are sent to the ADCs 330 and aggregated in the output registers 334 or output registers 312. The aggregated result is sent through a sigmoid operator 313 and stored in the memory buffer 310 for further processing, for example.

Figure 4:
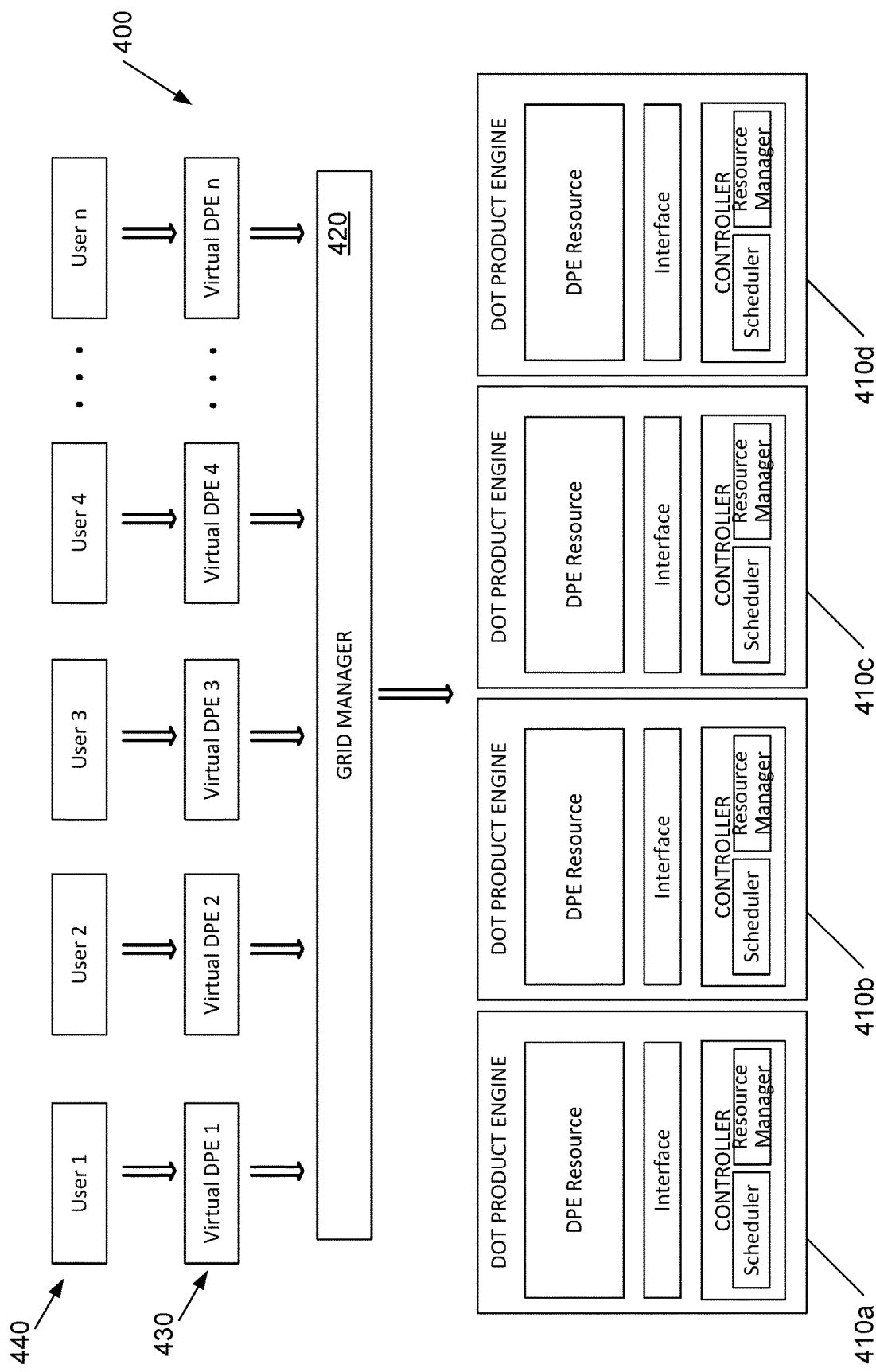
FIG. 4 illustrates another example system for virtualization of an array of memristive DPEs.

Referring now to FIG. 4, another example system for virtualization of an array of memristive DPEs is illustrated. In the example system 400 of FIG. 4, the single memristive DPE 110 of the example system 100 described above may be replaced or appended with multiple physical memristive DPEs 410a-d. In the example system 400 of FIG. 4, four physical memristive DPEs 410a-d are illustrated. In other examples, any practical number of physical memristive DPEs 410a-d may be provided.

The example system 400 of FIG. 4 allows formation of a virtual platform capable of managing multiple physical memristive DPEs and operating at rack-scale. In this regard, multiple or numerous physical memristive DPEs 410a-d, as well as their resources, may be pooled together to provide a large resource pool. The pool of memristive DPEs 410a-d and/or the pool of DPE resources of the memristive DPEs 410a-d may be managed by a DPE grid manager 420. In various examples, the DPE grid manager 420 is an external component that uses administration interfaces to manage multiple memristive DPEs 410a-d and provide OS-like services to DPE users 440 through virtual DPEs 430. In this regard, the memristive DPEs 410 are dynamically requested, allocated and deallocated by a user or tenant (e.g., a virtual DPE 430) via the DPE grid manager 420.

Figure 5:
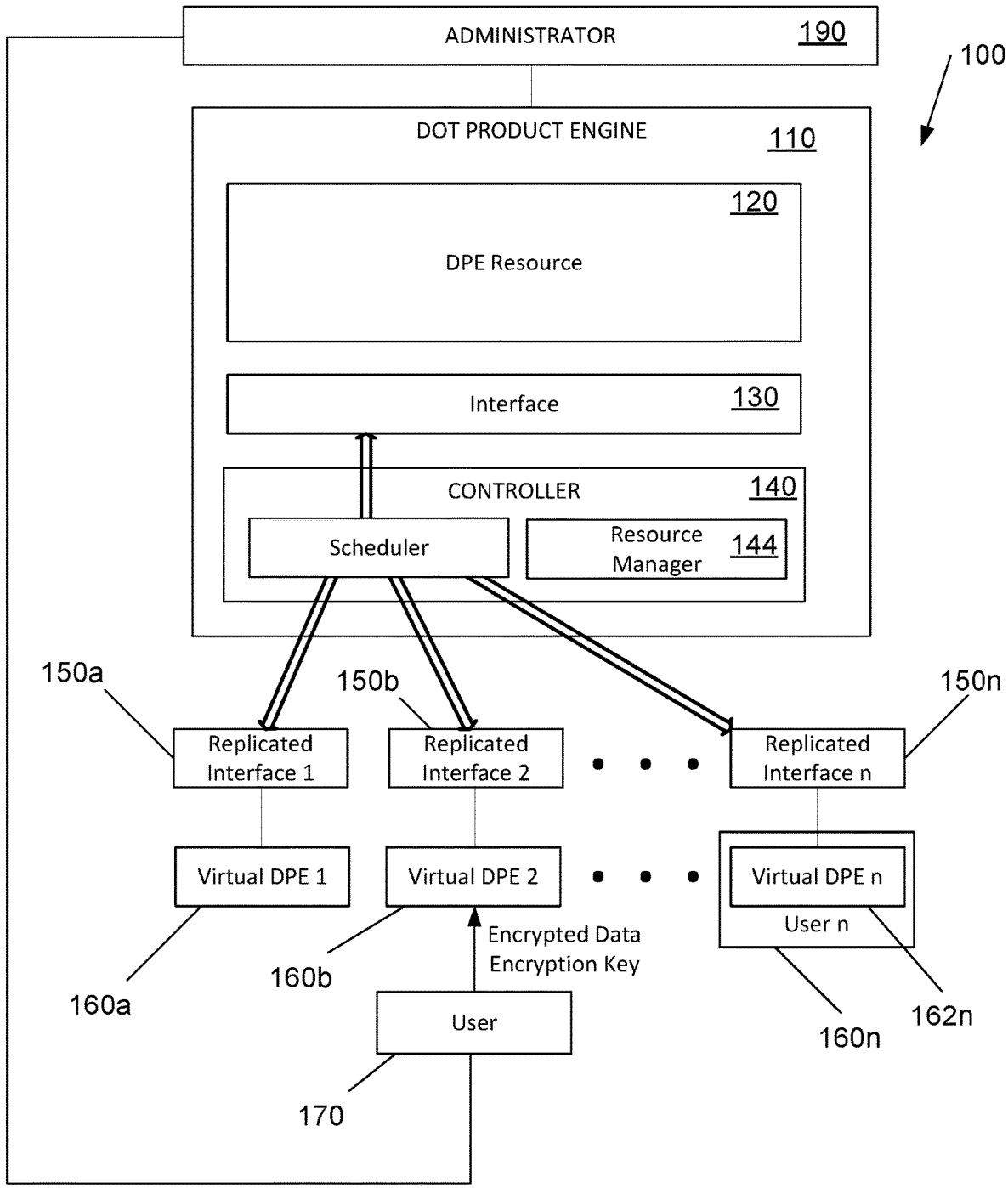
FIG. 5 illustrates another example system for virtualization of a memristive DPE with encrypted data exchange.

Referring now to FIG. 5, another example system for virtualization of a memristive DPE with encrypted data exchange is illustrated. FIG. 5 illustrates the example system 100 of FIG. 1 with a user 170 accessing the physical memristive DPE 110 via a virtual DPE 160b through the corresponding replicated interface 150b. As illustrated in FIG. 5, the user may access a shared resource, such as the physical memristive DPE 110, in a secure manner by exchanging information with the memristive DPE in encrypted form. For example, data uploaded by the user may be encrypted data. Encryption of the information may be decrypted by the DPE resource 120 of the memristive DPE 110 using encryption key provided by the user 170.

For sensitive workloads, the memristive DPE 110 may support the use of encrypted data using user-supplied encryption key on a layer-by-layer basis. Thus, instead of each stream layer user supplying data to the DPE in plaintext, data may be encrypted with a user-supplied key using a symmetric encryption algorithm such as AES. The memristive DPE 110 may transparently decrypt the input data just before processing on a tile and may re-encrypt the output data before it leaves the tile.

Use of encryption provides security to the user 170 of the shared memristive DPE 110, such as in a cloud environment. In this regard, encryption protects the user's information and activity from users of other virtual DPE's, such as virtual DPE's 160a, as well as an administrator of the memristive DPE, such as administrator 190 illustrated in FIG. 5. In the example illustrated in FIG. 5, the administrator 190 may be provided to control access to the memristive DPE 110. In this regard, when the user 170 desires access to the memristive DPE 110 to, for example, establish a virtual DPE session, the user 170 may submit a request to the administrator 190. If credentials provided by the user 170 are satisfactory, the administrator 190 may enable the user 170 to access the memristive DPE and to, for example, establish a virtual DPE session. The administrator 190 may impose limitations on access by the user 170, such as time limits on the virtual DPE session, for example. As noted above, the encryption of information from the user 170 prevents the administrator 190, or any other entity, from accessing the user's information.

Figure 6:
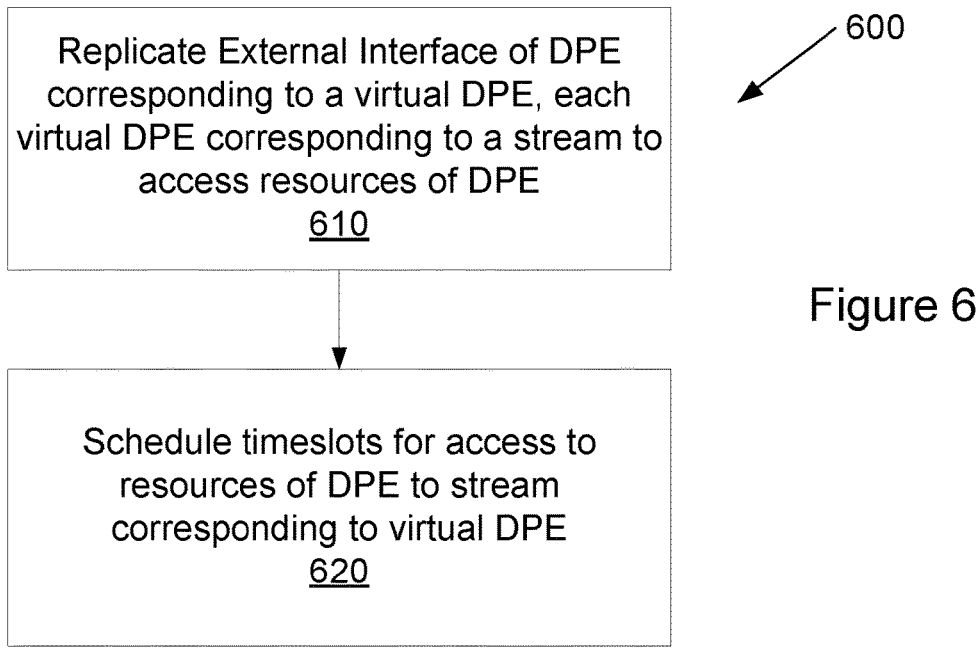
FIG. 6 is a flowchart illustrating an example method.

Referring now to FIG. 6, a flowchart illustrates an example method for using virtualized DPE. The example method 600 may be implemented in, for example, the controller 140 of the physical memristive DPE 110 or by another processor. The example method 600 includes replicating at least one external interface of a memristive DPE (block 610). In this regard, each replicated interface corresponds to a virtual DPE, and each virtual DPE corresponds to a stream layer for access to a resource of the memristive DPE.

The example method further includes scheduling timeslots for access to the DPE for stream layers corresponding to the virtual DPEs (block 620). As described above, in some examples, the physical memristive DPE may include a controller with a scheduler to dynamically select, on each timeslot, the stream layer, or virtual DPE, to run via the appropriate replicated interface. The scheduler may support any of a variety of scheduling algorithms, such as round robin and weighted round robin, for example.

Figure 7:
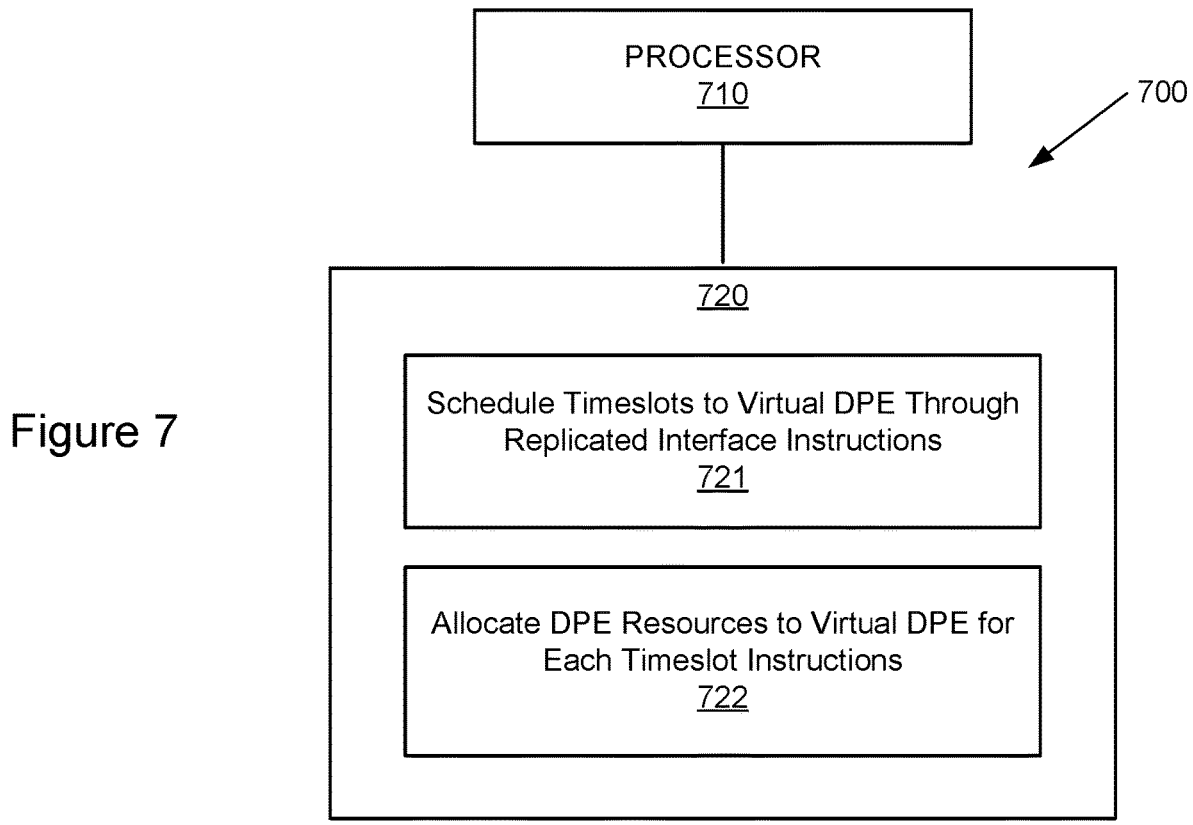
FIG. 7 illustrates a block diagram of an example system with a computer-readable storage medium including instructions executable by a processor for virtualization of a memristive DPE.

Referring now to FIG. 7, a block diagram of an example system is illustrated with a non-transitory computer-readable storage medium including instructions executable by a processor for particle sorting. The system 700 includes a processor 710 and a non-transitory computer-readable storage medium 720. The computer-readable storage medium 720 includes example instructions 721-722 executable by the processor 710 to perform various functionalities described herein. In various examples, the non-transitory computer-readable storage medium 720 may be any of a variety of storage devices including, but not limited to, a random access memory (RAM) a dynamic RAM (DRAM), static RAM (SRAM), flash memory, read-only memory (ROM), programmable ROM (PROM), electrically erasable PROM (EEPROM), or the like. In various examples, the processor 710 may be a general purpose processor, special purpose logic, or the like.

The example instructions include schedule timeslots to virtual dot product engines instructions 721. In this regard, a physical memristive DPE may be coupled to at least one replicated interface, each replicated interface corresponding to a virtual DPE, or stream layer. Timeslots may be scheduled to virtual dot product engines (DPEs) through corresponding replicated interfaces. Each replicated interface may couple the corresponding virtual DPE to a physical memristive DPE.

The example instructions further include instructions 722 to allocate DPE resources to a virtual DPE through replicated instructions. In this regard, resources of the physical memristive DPE may be selectively allocated to a virtual DPE for each timeslot.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A system, comprising:
at least one memristive dot product engine (DPE) having at least one resource, the DPE further having a physical interface and a controller, the controller being communicatively coupled to the physical interface, the physical interface to communicate with the controller to access the DPE; and at least one replicated interface, each replicated interface being associated with a virtual DPE, the replicated interface communicatively coupled to the controller, wherein the controller is to allocate timeslots to the virtual DPE through the associated replicated interface to allow the virtual DPE access to the at least one resource, and wherein the controller comprises:

a scheduler communicatively coupled to the physical interface and the at least one replicated interface, the scheduler being to identify a virtual DPE for each timeslot; and a resource manager to selectively allocate the at least one resource to a virtual DPE during each timeslot.

2. The system of claim 1, wherein the memristive DPE includes a memristive crossbar array having a number of row lines, a number of column lines intersecting the row lines, and memristive memory elements located at each intersection of a row line and a column line.

3. The system of claim 1, wherein the at least one memristive dot product engine (DPE) includes multiple memristive DPEs, the system further comprising:

a DPE grid manager coupled to each of the multiple memristive DPEs, the DPE grid manager to pool the multiple DPEs for pooling of the resources of the multiple DPEs.

4. The system of claim 1, wherein at least one replicated interface is to exchange information with the memristive DPE in encrypted form, the information in encrypted form to be decrypted by an encryption key from a user associated with the virtual DPE corresponding to the replicated interface.

5. A method, comprising:

replicating at least one external interface of a memristive dot product engine (DPE), each replicated interface corresponding to a virtual DPE, each virtual DPE corresponding to a stream layer for access to a resource of the DPE; and scheduling, by a scheduler communicatively coupled to the external interface and each of the replicated interfaces, timeslots for access to the DPE for stream layers corresponding to the virtual DPEs, wherein the scheduling comprises:

identifying a virtual DPE for each timeslot; and
selectively allocating the resource to a virtual DPE during each timeslot.

6. The method of claim 5, wherein the memristive DPE includes a memristive crossbar array having a number of row lines, a number of column lines intersecting the row lines, and memristive memory elements located at each intersection of a row line and a column line.

7. The method of claim 5, further comprising:

pooling multiple memristive DPEs to pool resources of the multiple memristive DPEs for allocation at the timeslots.

8. The method of claim 5, further comprising:

receiving information from a replicated interface in encrypted form, the information in encrypted form to be decrypted by an encryption key from a user associated with the virtual DPE corresponding to the replicated interface.

9. A non-transitory computer-readable storage medium encoded with instructions executable by a processor of a computing system, the computer-readable storage medium comprising instructions to:

schedule, by a scheduler communicatively coupled to a physical interface of a physical memrisive DPE, timeslots to virtual dot product engines (DPEs) through corresponding replicated interfaces, each replicated interface coupling the corresponding virtual DPE to the physical memristive DPE; for each of the timeslots, identifying a virtual DPE of the virtual DPEs; and selectively allocating resources of the physical memristive DPE to the virtual DPE for each timeslot.

10. The non-transitory computer-readable storage medium of claim 9, wherein the physical memristive DPE includes a memristive crossbar array having a number of row lines, a number of column lines intersecting the row lines, and memristive memory elements located at each intersection of a row line and a column line.

11. The non-transitory computer-readable storage medium of claim 9, further comprising instructions to:

pool multiple physical memristive DPEs to pool resources of the multiple physical memristive DPEs for allocation at the timeslots.

12. The non-transitory computer-readable storage medium of claim 9, further comprising instructions to:

receive information from a replicated interface in encrypted form, the information in encrypted form to be decrypted by an encryption key from a user associated with the virtual DPE corresponding to the replicated interface.

* * * * *